United States Patent
Adams et al.

(10) Patent No.: US 10,728,275 B2
(45) Date of Patent: Jul. 28, 2020

(54) METHOD AND APPARATUS FOR DETERMINING A THREAT USING DISTRIBUTED TRUST ACROSS A NETWORK

(71) Applicant: Trust Networks Inc., Mt Airy, MD (US)

(72) Inventors: Mark Adams, Cheltenham (GB); Daniel Meacham, Mt Airy, MD (US); Simon Meacham, Mt Airy, MD (US)

(73) Assignee: Lyft Inc., San Francisco, CA (US)

( * ) Notice: Subject to any disclaimer, the term of this patent is extended or adjusted under 35 U.S.C. 154(b) by 334 days.

(21) Appl. No.: 15/922,695

(22) Filed: Mar. 15, 2018

(65) Prior Publication Data

US 2018/0309782 A1 Oct. 25, 2018

Related U.S. Application Data

(60) Provisional application No. 62/471,365, filed on Mar. 15, 2017.

(51) Int. Cl.

| H04L 29/06 | (2006.01) |
|---|---|
| H04L 29/08 | (2006.01) |
| H04W 12/00 | (2009.01) |
| H04L 9/32 | (2006.01) |

(52) U.S. Cl.
CPC ........ *H04L 63/1441* (2013.01); *H04L 9/3239* (2013.01); *H04L 63/10* (2013.01); *H04L 63/102* (2013.01); *H04L 63/1408* (2013.01); *H04L 63/20* (2013.01); *H04L 67/12* (2013.01); *H04L 67/327* (2013.01); *H04W 12/00505* (2019.01); *H04L 2209/38* (2013.01)

(58) Field of Classification Search
None
See application file for complete search history.

(56) References Cited

U.S. PATENT DOCUMENTS

| 8,505,102 | B1 * | 8/2013 | Cannings | H04L 63/145 |
|---|---|---|---|---|
| | | | | 713/187 |
| 10,091,230 | B1 * | 10/2018 | Machani | H04L 63/1433 |
| 10,460,103 | B2 * | 10/2019 | Bender | G06F 21/554 |
| 2017/0346846 | A1 * | 11/2017 | Findlay | H04L 63/1433 |
| 2018/0359244 | A1 * | 12/2018 | Cockerill | H04L 63/0823 |
| 2019/0319987 | A1 * | 10/2019 | Levy | H04L 63/0838 |

* cited by examiner

*Primary Examiner* — Shin-Hon (Eric) Chen

(74) *Attorney, Agent, or Firm* — Dana Legal Services; Jubin Dana; John Dahnad

(57) ABSTRACT

A system and method are disclosed wherein a risk score is generated by interrogating multiple sources of information across a network. The information is aggregated, such that every network action for individuals and organizations are turned into a unique behavioral model, which can be used as a unique identifier ("fingerprint"). This fingerprint is in turn used by a personalized Trust Guardian System to block, modify and/or allow network actions.

6 Claims, 9 Drawing Sheets

METHOD AND APPARATUS FOR DETERMINING A THREAT USING DISTRIBUTED TRUST ACROSS A NETWORK

CROSS-REFERENCE TO RELATED APPLICATION

This application claims the benefit of U.S. Provisional Application Ser. No. 62/471,365 filed on Mar. 15, 2017 with title METHOD AND APPARATUS FOR EVALUATING DISTRIBUTED TRUST ACROSS A NETWORK by Mark ADAMS et al., the entire disclosure of which is incorporated herein by reference

FILED OF THE INVENTION

The application is related to networked devices and, more specifically, to tracking activity of networked devices.

BACKGROUND

Providing user network access often requires some form of security to prevent malicious attacks. Many current application-aware firewalls and intrusion detection systems/intrusion prevention systems (IDS/IPS) systems are intended to prevent malicious attacks. For example, a security protocol typically implements access security for the network by putting in place and managing network access policies or rules. Currently known methods of access security, when configured properly, can usually protect both the user devices and the network itself from malicious attacks and abuses.

Various approaches have been taken to implement access security. One approach sets common filtering rules for the entire enterprise or operator network. These rules or policies may be specific for the type of traffic, the specific services to be provided, the user location, the identity of the user in the protected network, the type of access technology being used for access as in the case of a multimodal device that use any one of a number of access technologies.

In some multimodal networks, separate access networks or specific access technologies have unique corresponding IP subnets assigned to them. For these networks the application-aware firewalls are configured to have a specific security policy per subnet of IP addresses.

Another approach to managing security is to set security policy depending upon the identity of the user and/or the user's duties. In a network often there are different roles, functions or privileges assigned to each user. An authorized device may be utilized by any one of a number of various users for network access. Each user is subject to the network security policy determined by his or her identity. Consequently, it is possible to implement access security such that when a user accesses the network, the user is identified and authenticated and then the policies associated with the assigned role, function or privileges assigned to the user are used to provide control over the user's access to resources. An example of this type of approach is the use of access control lists (ACLs), for role-based or user-based access controls.

FIG. 1A shows a user 10, a user 12, a user 14 using a device 16 to access a network 20 through the access point 18. Each user has a different identity and may have different roles or privileges. The device 16 accesses the network 20 through an access point 18 which typically is a security proxy which controls access and traffic in both directions.

FIG. 1B shows a user 22 accessing any one of the devices 24a, 24b, and 24c to access a network 26 using an access point 28. No matter which device 24 the user 22 utilizes to access the network 26, since the user 26 always uses the same identity, the same role and the same privileges, the same security policies will be applied.

Known networks are generally built based on an assumed fixed access technology being used. The resulting security mechanisms to secure the network (for example, filtering rules, access control, intrusion detection criteria, traffic management) therefore are tailored to the characteristics of the assumed fixed access technology being used.

Fixed/mobile converged networks support multimodal devices having multiple wireless and fixed network interfaces, such as UMTS, WLAN, WiMax, CDMA2000, and Ethernet, each having their own unique access security requirements. Multimodal devices can use any one of a number of different types of access technologies to connect to the access network that could have uniquely different protocols, standards, and hence unique potential vulnerabilities to specific exploits and attacks. The different access technologies could have very different physical layer characteristic requirements such as bandwidth, delay, packet loss, and handoff parameters, and could have very different requirements for access to network connections, authentication, encryption, and integrity of data. The normal performance capabilities and capacities may also be quite different from one another. This dictates that security requirements, criteria, and mechanisms in UMTS, WLAN, WiMax, fixed networks, etc. are all different. The natural background traffic, capabilities, and traffic characteristics (bandwidth, delay, error-rates, etc.) also vary for different technologies.

In a multimodal converged network, security mechanisms that are to be effective cannot make the assumption that a single access technology will be used because no single fixed set of mechanisms specific to a single access technology will be sufficient to provide security to the multimodal converged network. A fixed/mobile converged network which provides support for multimodal device mobility provides for end-user access to the network using any access technology of the multimodal device and provides dynamic security to a user's access when the user changes the access technology of the multimodal device while maintaining the same user identity registered on the security policy enforcement point.

Generic rules and policies or those based on the user's identity and his credentials of known systems do not provide an appropriate level of security according to the distinctive characteristics of the various different access technologies of the multimodal device. For example, firewall/filtering or IDS/IPS rules even when being specific per user's identity (and corresponding credentials) do not take into account the situation when an attacker has obtained network access information. When an attacker uses real, but stolen, network access information and the network receives the access information, the network will allow the attacker access to the network. Also, the attacker's behavior and actions are not available to nor considered by the network. Known networks or systems that control access to networks do not track the behavior of an attacker.

For example, for wireless network access the threshold number of packets for setting off a "malicious scan indication" is generally lower than the same thresholds for fixed network access. In a fixed network, a high number of packets, which in a wireless network would usually be an indication of a malicious attack such as a flooding attack, are nothing more than rather neutral conditions in the fixed network.

Therefore, what is needed is a system and method for interrogating multiple source of information across a network to determine a risk score for a requestor seeking access to a device or a network.

SUMMARY

In accordance with various aspects of the invention, an accurate score of the risk (risk score) is generated for a given activity or network entity/URI. The risk score is an indicator that the activity or network entity is genuine and allowed to continue with the activity. The accuracy of the score is increased by crowdsourcing the probability through interrogation of multiple sources of information across a network. The sources correspond to people, devices, and software which may contain a fragment of information about the given activity or network entity/URI under examination. In accordance with the various aspects of the invention, the system and method propagate the provenance ("trust") of a person (or that activity by the person) using collection of data through a distributed network, such as the internet.

In accordance with various aspects of the invention, the system and method can also determine, using a 'score' or rating, what is genuine and non-genuine information within a network, such as the internet.

BRIEF DESCRIPTION OF THE DRAWINGS

The invention is described in accordance with the aspects and embodiments in the following description with reference to the figures, in which like numbers represent the same or similar elements, as follows.

DETAILED DESCRIPTION

Reference throughout this specification to "one embodiment," "an embodiment," or similar language means that a particular feature, structure, or characteristic described in connection with the various aspects and embodiments are included in at least one embodiment of the invention. Thus, appearances of the phrases "in one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

In accordance with the various aspects and embodiments of the invention, there is a Trust Guardian System and a Trust Network and a protocol (OpenTrust) is used with a public BlockChain (Trust Chain).

Figure 1:
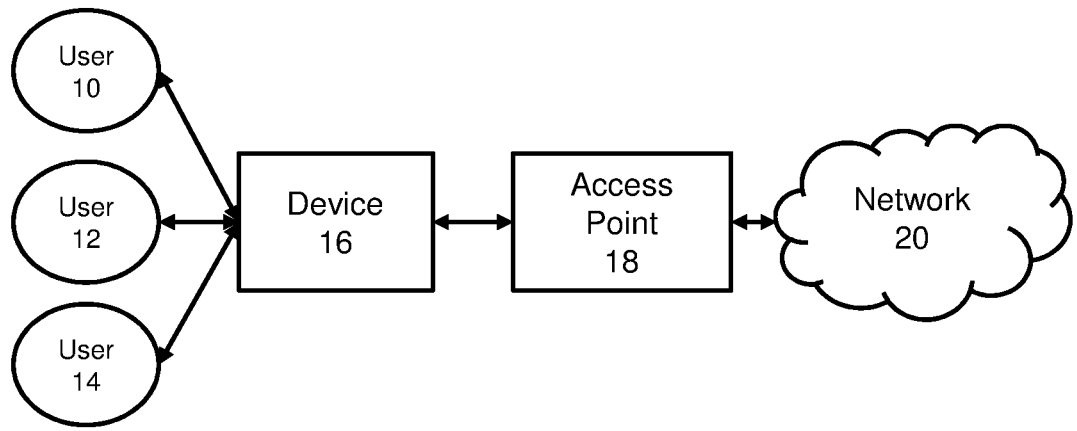
FIG. 1 shows a system for providing secure access for multiple users to a network, through a device.
Figure 2:
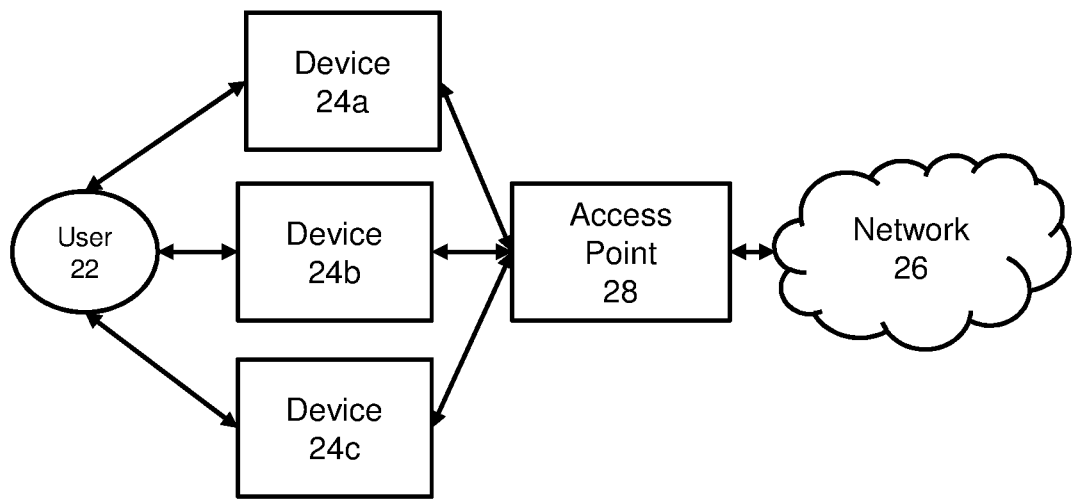
FIG. 2 shows a system for providing secure access for a user to a network, through multiple devices.
Figure 3:
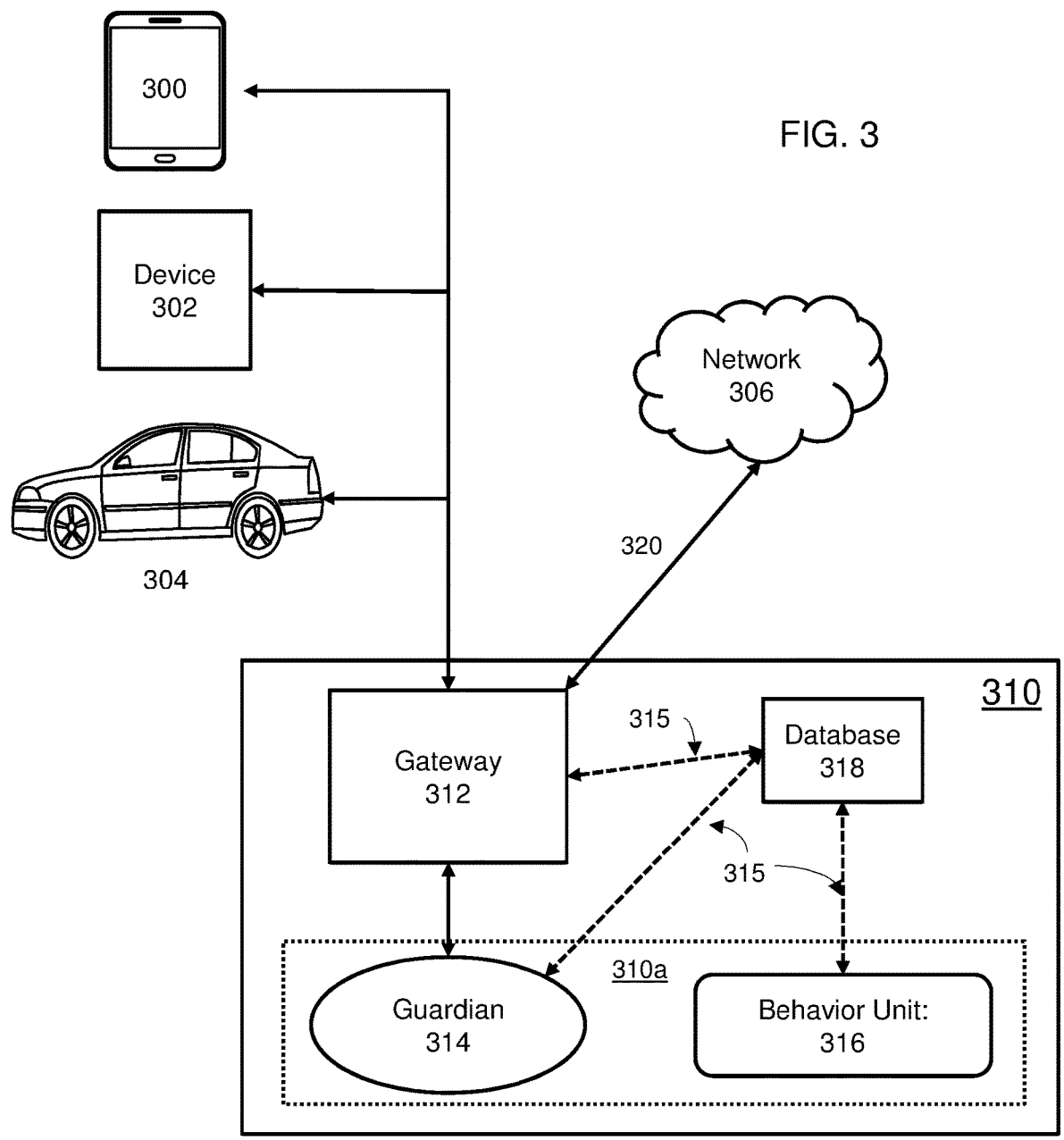
FIG. 3 shows multiple users or devices accessing a network through a Trust Guardian System in accordance with the various aspects and embodiments of the invention.

FIG. 3 shows devices 300, 302, and 304 communicating with a network 306 through a Trust Guardian System (TGS) 310 in accordance with the various aspects of the invention. The devices 300, 302, and 304 can be any type of device capable of communication with any network, using any protocol. For example, the devices 300, 302, and 304 may be a mobile device or mobile network, a home user's broadband modem/router using the internet, a router, a business network, an IOT hub with IOT devices, or a car's device controller.

The devices 300, 302, and 304 use the network 306. In accordance with some aspects and embodiments of the invention, the TSG 310 includes a gateway or an access point 312, a guardian 314, a behavior unit 316, and a memory or database 318. In accordance with other aspects and embodiments of the invention, the database 318 may be in communication, as indicated by communication link 315, with any one or all of the following: the gateway 312, guardian 314 and the unit 316. In accordance with other aspects and embodiments of the invention, the TGS 310 includes the guardian 314 and a behavior unit 316, as indicated by 310a. The gateway 312 is in communication with the network 306, through link 320, and the devices 300, 302, and 304. The gateway 312 is in communication with the guardian 314. The guardian 314 is in communication with the analysis or behavior unit 316. The unit 316 performs risk analytics and stores information associated with other nodes or devices that are using the network 306. A risk score is a probability score and a trust score is related to the risk score in terms of mathematical probability, as follows:

$$1-(\text{risk score}) = \text{trust score}$$

In accordance with some aspects of the invention, the unit 316 uses the analytics performed and information stored to build a variety of different risk graphs, as discussed below. The risk graphs, as discussed below, can be visually presented to a security operator.

The TGS 310 protects the devices 300, 302 and 304. The TGS 310 sits between the devices under protection and the network 306. Consider any one device, for example the device 302. The device 302 does not know what services or devices, which use or access the network 306, can be trusted. The gateway 312 provides an interface between the TGS 310, such as the guardian 314, and the network 306. The gateway 312 allows integration of all the devices (device 300, device 302, and device 304) that the TGS 310 protects. Any interrogation or probing of data on any device, such as the device 304, that is sitting behind the network 306 is protected by the TGS 310. The TGS 310 controls the ability to interrogate or probe for data at the device that the TGS 310 protects. For example, the TGS 310 controls, using the gateway 312 and the unit 316: response to request for data; network data inspection; the ability to modify data by the interrogator; the ability to redirect the communication to a false data source or a false node; the ability to reroute the communication to a different source or different node without alerting the attacker; the ability to block data from traversing the gateway 312; the ability to modify the communication protocol; the ability to alter the communication parameters; and the ability to gather further information about the requestor or interrogator.

In accordance with some embodiments of the invention, the gateway 312 makes very few decisions and houses limited intelligence. The guardian 314 is where access related decisions are made with respect to the communication or interrogation or probe. The guardian 314, based on analysis done by the unit 316, controls the data acquisition and device/data traversal functions. Some functions performed by the TGS 310 includes deep, layered data analysis and data storage. In accordance with some embodiments of the invention, the unit 316 is located remotely, such as in a cloud service with computation power. The behavioral analytics provides a deep picture of the risks of the network 306. Information about or feedback from the probe at the gateway 312 is provided to the unit 316. Based on the analysis performed by the unit 316, the guardian 314 makes a decision and passes the decision to the gateway 312 to implement.

Figure 4:
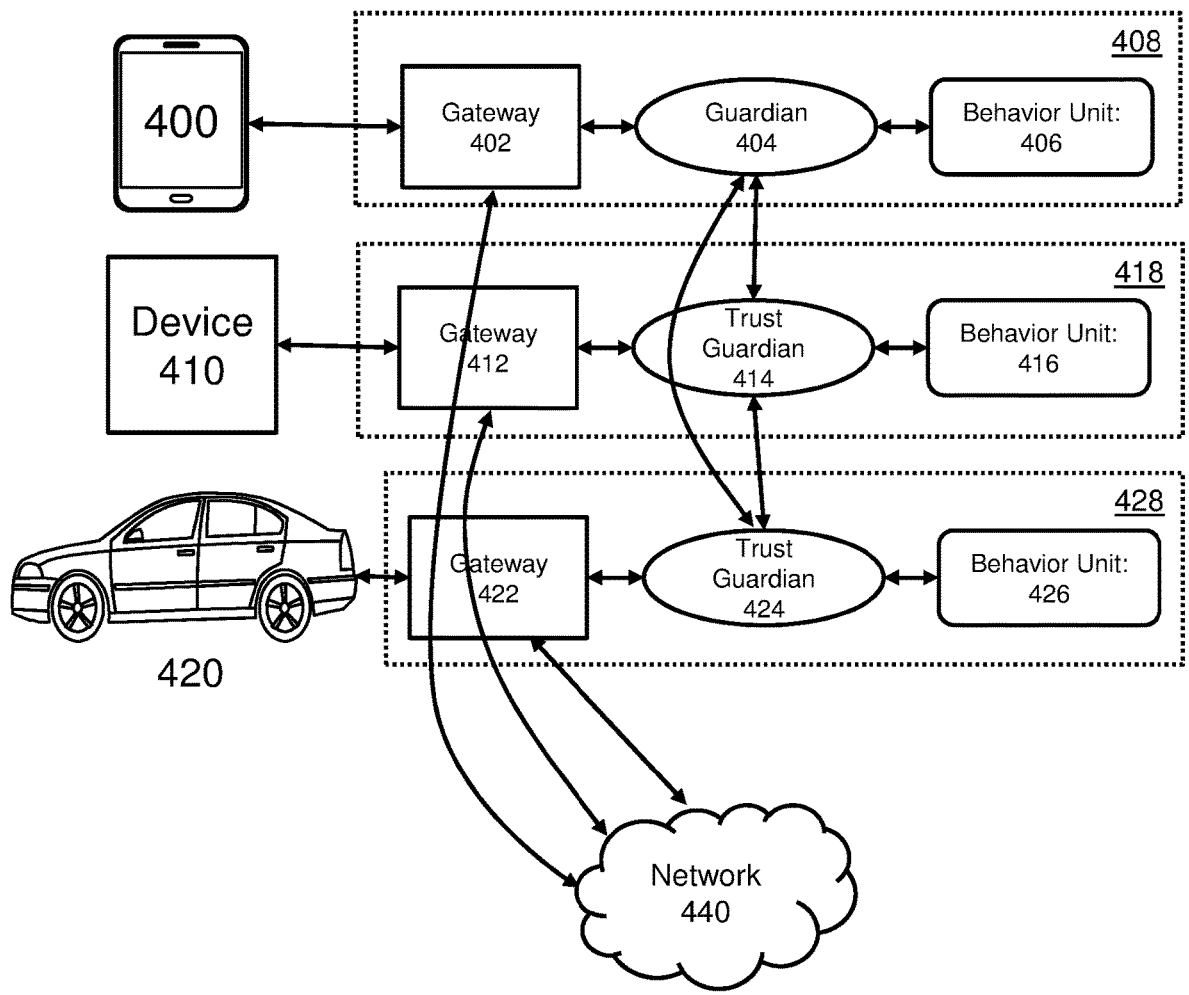
FIG. 4 shows multiple users or devices, each through its own Trust Guardian System, accessing a network in accordance with the various aspects and embodiments of the invention.

FIG. 4 shows a network of TGSs 408, 418, 428 working together and in communication. The TGS 408, in accordance with some embodiments of the invention, includes a gateway 402, a guardian 404 and a behavior unit 406. The TGS 418, in accordance with some embodiments of the invention, includes a gateway 412, a guardian 414 and a behavior unit 416. The TGS 428, in accordance with some embodiments of the invention, includes a gateway 422, a guardian 424 and a behavior unit 426. The gateways 402, 412, and 422 are in communication with a network 440.

In accordance with some embodiments of the invention, the guardians 404, 414, and 426 are in communication with each other in a peer-to-peer setup. In accordance with some embodiments of the invention, the guardians 404, 414, and 426 are in communication with each other in a hub-and-spoke mechanism (not shown). The TGSs 408, 418, and 428, through the communication of the guardians 404, 414, and 424, have access to the risk picture and can communicate with other guardians. This network of guardians allows the guardians to share their unique view of a risk picture.

Figure 5:
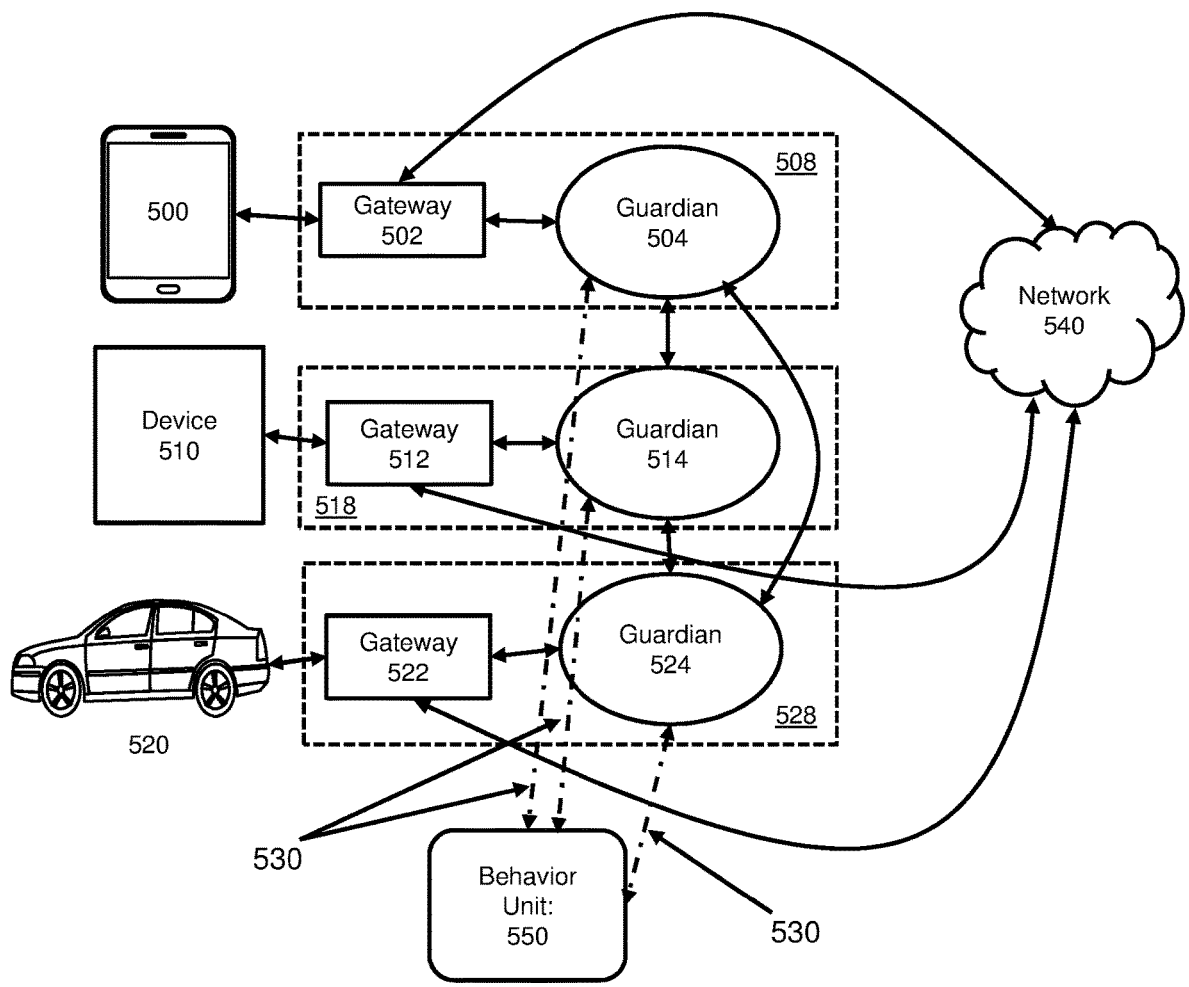
FIG. 5 shows multiple users or devices accessing a network through Trust Guardian Systems in accordance with the various aspects and embodiments of the invention.

FIG. 5 shows a hierarchy of guardians that follow the natural hierarchy of a network 540 and TGSs 508, 518, 528. The guardians 504, 514, and 524 are in communication with each other, either as peer-to-peer or hub-and-spoke, and deployed to the network 540 through gateways 502, 512, and 522, respectively, in accordance with some embodiments of the invention. The guardians 504, 514, and 524 are also in communication with a behavior unit 550, as shown by communication paths 530. The unit 550 generates a risk graph represented by a several guardians within various TGSs. The guardians 504, 514, and 524 are part of a complex systems, which includes hierarchies and layers, wherein the connections between the TGSs form a graph. In accordance with various aspects and embodiments of the invention, guardians are deployed to places where there are logical points of trust in the network, or where there are trust boundaries. The guardians 504, 514, and 524 protect the devices 500, 510, and 520, respectively. The guardians 504, 514, and 524 can talk to each other, can talk to a guardian higher in the hierarchy, and the higher hierarchical nodes can themselves be peers.

Figure 6:
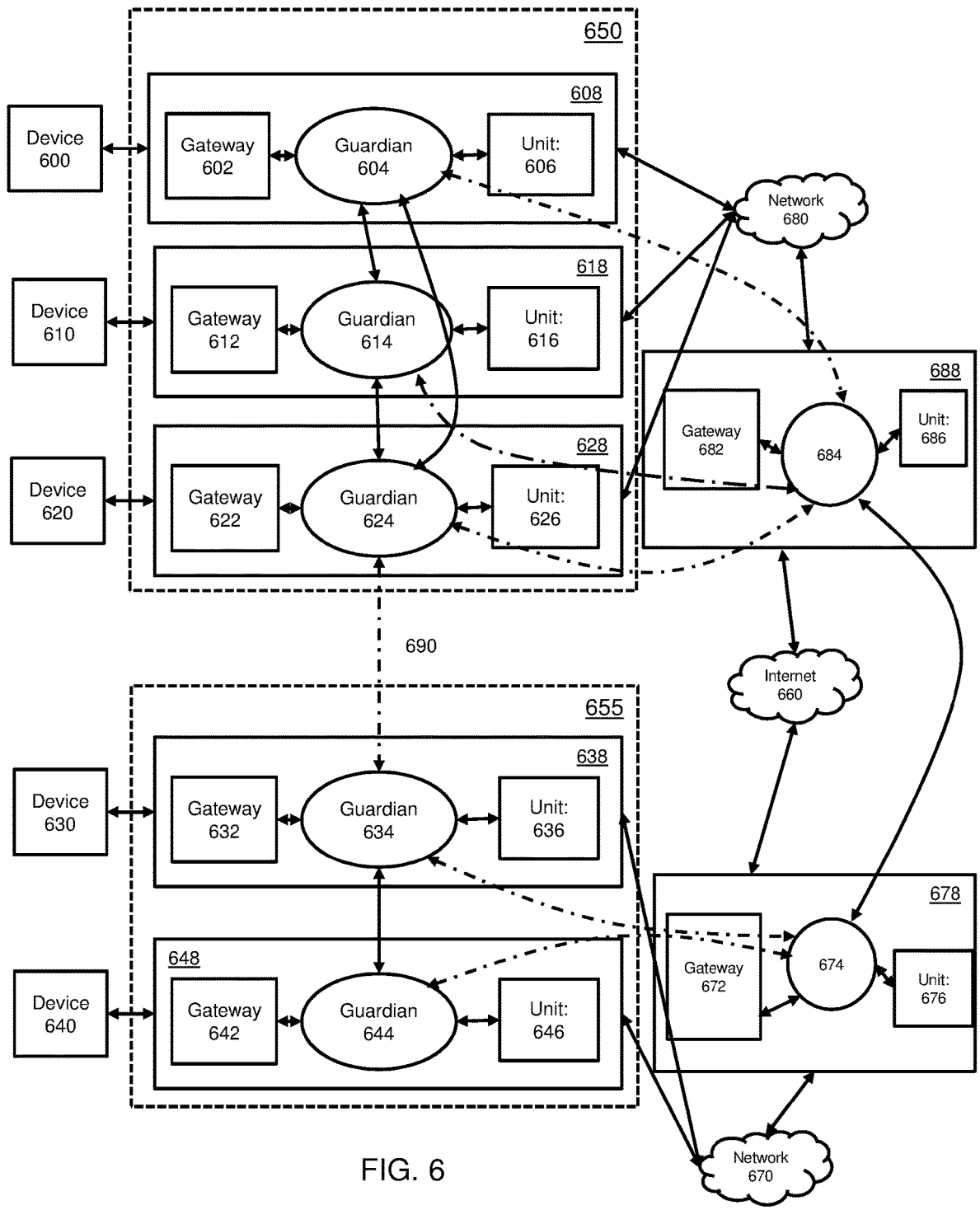
FIG. 6 shows multiple users or devices, within an organization, accessing a network through Trust Guardian Systems in accordance with the various aspects and embodiments of the invention.

FIG. 6 shows an enterprise 650 communication through a network 680 and an enterprise 655 communicating through a network 670. The network 670 is connected to the internet through a TGS 678. The network 680 is connected to the internet through a TGS 688. In accordance with some aspects and embodiments of the invention, the enterprise 650 includes TGSs 608, 618, and 628 protecting devices 600, 610, and 620, respectively. In accordance with some aspects and embodiments of the invention, the enterprise 655 includes TGSs 638 and 648 protecting devices 630 and 640, respectively. In accordance with some embodiments of the invention, each TGS protects only one device. The scope of the invention is not limited by the number of devices that a TGS protects. For example, in accordance with some embodiments of the invention, the TGS 608 may protect multiple devices. Each TGS, such as TGS 608, includes a gateway, a guardian, and a behavior unit, such as gateway 602, guardian 604, and behavior unit 606.

Referring again to FIG. 6, in accordance with some aspects and embodiments of the invention, the behavioral analysis unit can be consolidated into a single function which is accessed from multiple guardians. This is a mode of deployment which would be useful in enterprises and allows consolidation of resources. In accordance with some aspects of the invention, the overall system can be represented as a tree with the internet at the top of the tree and the devices at the bottom.

The TGS makes assessments of the probability that any device is behaving correctly, or that two devices should trust each other using analytics and visual graph. When connections are observed, which trigger a threshold or for which certain rules apply, the guardian of a TGS decides to invoke a trust decision and ask other guardians to vote on the decision. For example, device (or user) 702 and device (or user) 704, through their respective TGS and guardians, can ask guardian 706 about other devices. The guardian 706 relies on analytics performed by a behavior unit 708.

Figure 7A:
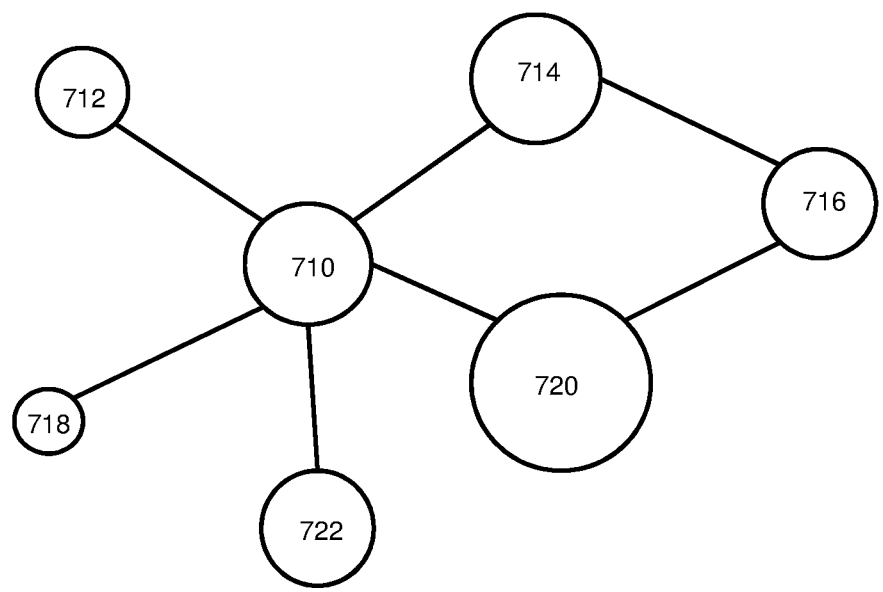
FIG. 7A shows a graphical representation of risk for various nodes in accordance with the various aspects and embodiments of the invention.
Figure 7B:
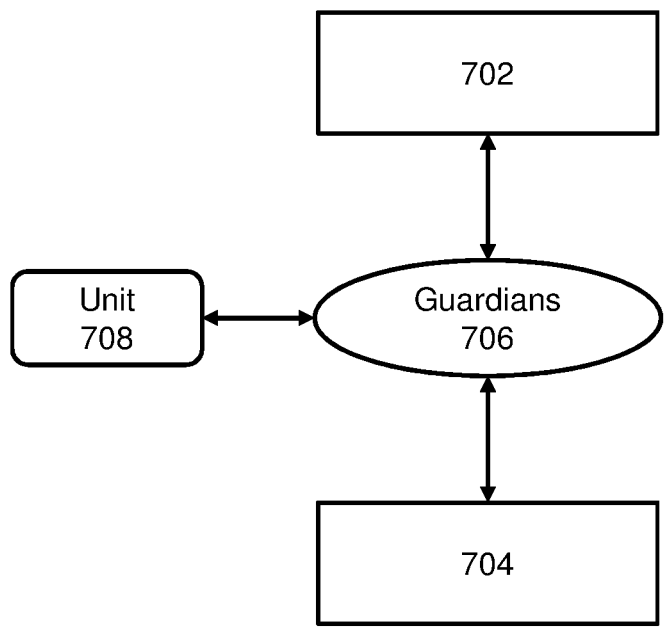
FIG. 7B shows multiple users or devices communicating with a Trust Guardian System of another user in accordance with the various aspects and embodiments of the invention.

FIG. 7A shows a graph that represents risk and categories of risk based on data analysis with nodes. This graph provides a summarized and accurate representation of the risks across the nodes of a network because risk calculations take place in real-time. Activity or communication takes place that is associated with a particular node, such as nodes 710, 712, 714, 716, 718, 720, and 722. The activity is analyzed by a behavior unit, such as unit 708 of FIG. 7B. The analyzed data is collected and gathered. Potential threats are identified. The threats are categorized using a risk category ontology that allows all the related risks to be grouped together and presented visually to a user. Risks in the same risk category are treated with similar probability factors, which allows them to be viewed as similar risks. Thus, risks that are not related can be treated differently. In accordance with some aspects of the invention, as the activity and the risk associated with node 712 increases, the visual representation of node 712 changes in size. In accordance with some aspects of the invention, as the risk increases, then the size of the node is increased. In accordance with some aspects and embodiments of the invention, the color of node 712, as shown on a display, may be changed. The visual graph allows an immediate feedback to a security operator. Accordingly, certain risks are elevated above other risks as being more significant and can be flagged as urgent for the security operator.

Figure 8:
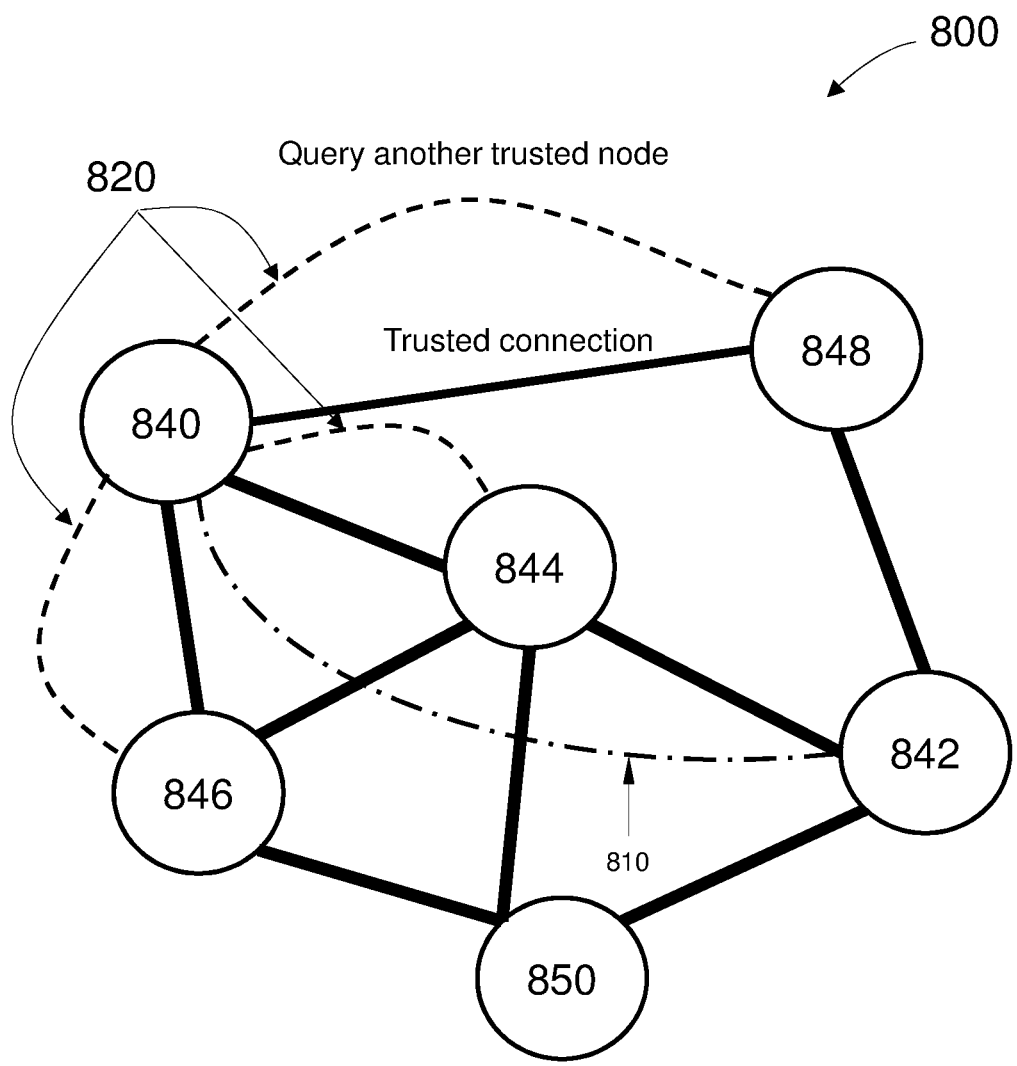
FIG. 8 shows a communication graphs having multiple nodes in communication and using a Trust Guardian System in accordance with the various aspects and embodiments of the invention.

FIG. 8 shows a graph 800 that represents the relationship between devices or nodes 840, 842, 844, 846, 848, and 850 in accordance with various aspects and embodiments of the invention. The solid line connecting node 840 to node 844 represents a trust relationship between two nodes. The graph 800 can also include other features, such as the risk categories and the services being accessed, which are not shown. The information in graph 800 can be distributed so that parts of the graph are held by different guardians. Each guardian controls what information is shared with other guardians. Thus, privacy is protected as the guardians work on behalf of the device owner and/or network owners.

In one example of communication behavior or activity, node 840 receives a request or communication from a new/unknown source or node, such as node 842, as shown by the link 810. The TGS of node 840 asks or send a query to the TGS of all its trusted nodes, such as nodes 844, 846, and 848, about the node 842 as depicted by the solid line connecting these nodes. The query activity or communication that is sent from node 840 and the response to the query is depicted by the broken lines 820. Based on the information provided to the TGS of node 840, the risk of communicating with node 842 is determined. The risk can be represented visually, such as shown in FIG. 7A, by altering the visual features of the node.

The risk associated with any node is dynamic and changes over time. Thus, the risk decays over time. Some risky activity may not register as a very high risk because it is an isolated or single activity. However, when this risky activity is repeated, the TGS can raise the risk score. Thus, isolated instances of low risk activity, when repeated over a period of time, can result in a high risk score due to the repetition of the activity over a period of time.

When summarizing the risk in graph, a time-decay function can be applied so that risks, which have been observed recently, are given a higher risk weighting than those that are older or occurred further back and have not been observed recently. Thus, a decayed risk score can be immediately increased because of the cumulative effect of repeating risky behavior.

The guardian that invoked this procedure can then form a trust view using all of the data provided by other guardians. The guardians ask simple questions, such as "do you trust device X," that do not leak domain-specific information about the originating network or private information.

When certain risky events are observed (e.g. an Indicator-of-Compromise is observed) this information about the risk is used by the behavioral analytics to compute a risk graph. Risks such as IOCs are mapped to risk categories, and in the risk graph, graph edges are stored between:
    device identifiers and risk categories.
    device identifiers and service addresses.
    service addresses and risk categories.

The edges are associated with timing information, so that it is possible to see the last time a risk category was associated with a device or service address. Risk categories are mapped to a risk category probability. The risk associated with an edge is computed by taking a risk category probability and applying a time decay function to the probability, and the last time it was observed. The risk associated with a device is computed by calculating: 1 minus the product of (1−edge risk) for all risk edges associated with that device. The risk associated with a service is computed by calculating: 1 minus the product of (1−service risk) for all risk edges associated with that service. Thus, a risk picture for a device and service can be calculated quickly, and decays over time. As the risk picture grows, the risk graph grows to describe all risks on the network or on the internet.

Trust Chain

Each guardian, in a TGS, has a private/public key which it uses for authentication and communication with other guardians. Over time guardians have a set of artefacts that define their trust model. This model can be treated with a hash function to produce a "trust hash" for each guardian. The Trust Chain is a blockchain that contains trust hashes and public keys. If a guardian attempts to impersonate another device, its trust hash will not match its trust model, or communicate with a private key, which matches the public key, and so it will not be able to integrate with the trust network. Thus, it is not possible to introduce fake trust information into the network protected by the TGS.

Figure 9:
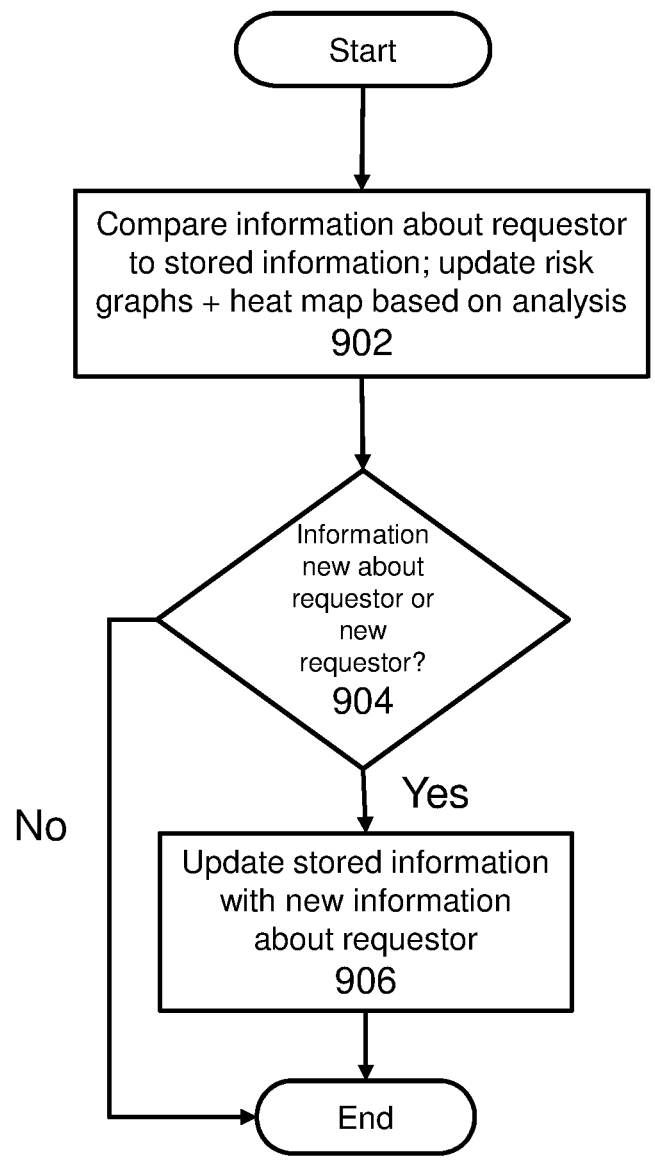
FIG. 9 shows a flow process for building information about nodes through interrogation of multiple sources of information across a network in accordance with the various aspects and embodiments of the invention.

Referring now to FIG. 9, the process is shown for collecting information about a user or an organization using the TGS. The TGS is a behavior monitoring system designed to protect the user or organization online by building up a behavioral model of the user or organization through examination of their network usage. At step 902, existing information, which is based on behavior, is analyzed to determine if an action by a requestor is new or different. At step 904, the TGS determines if the information if new. At step 906, the information stored about user or organization is updated. Given that the TGS is a distributed network of guardians that communicate with one another, the accumulation of behavior models is used to calculate a Trust Score related to a particular person, network entity/URI, or activity. By aggregating Trust Scores across a network of guardians representing people and organizations across a Trust Network, in real time, an accurate real time representation of trust vs risk can be calculated without violating the privacy of those people and organizations.

The behavior unit aggregates and turns every network action for individuals and organizations into a unique behavioral model that is used as a unique identifier ("fingerprint"). The fingerprint is used by a personalized guardian in a Trust Guardian System to block or allow network actions depending on how much each action is trusted. The user or organization secures themselves through their own unique behavior. The behavior is tested on a per transaction level, using a set of primitive questions, that allow trustworthiness to be measured without releasing personal or private data. Network observations can also be aggregated in a probabilistic fashion and used to automatically block internet security threats before they even reach our customers. The TGS can be further enhanced by adding data gathered from virtual probes on the network to measure random background activity to improve measurements of trust and block malicious actors before they reach our clients. This system ideally would use data aggregated across individuals, organizations and populations.

Figure 10:
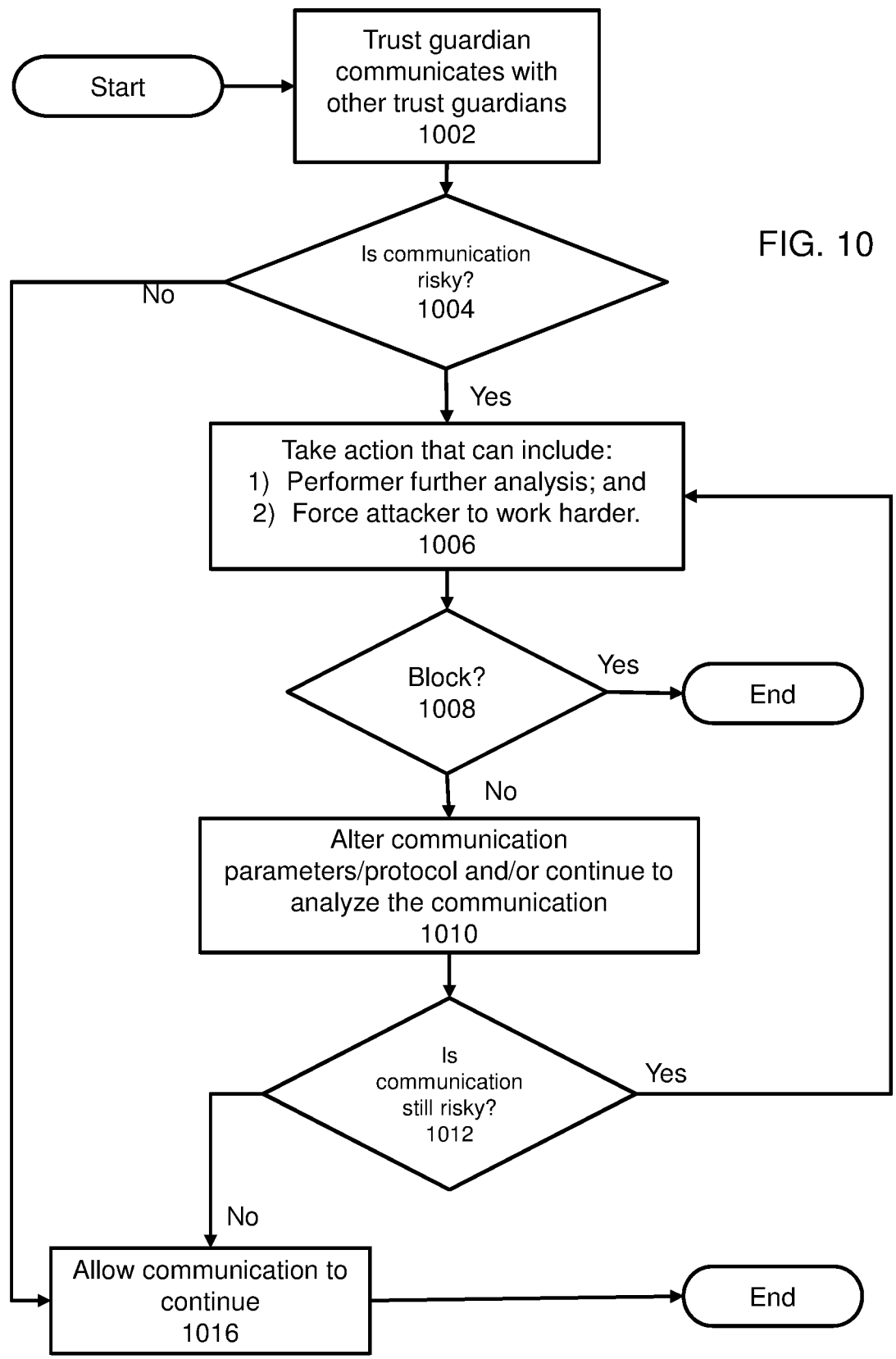
FIG. 10 shows a flow process for accessing risk associated with a communication in accordance with the various aspects and embodiments of the invention.

Referring now to FIG. 10, a process is shown for controlling the communication. The TGS will store a summary of network activity performed by individuals, organizations and networks for the purposes of analyzing behavior over time. At step 1002, guardians within a TGS communicate with other guardians about a user, enterprise, or activity. This builds a probabilistic model of a user, enterprises or population's behavior. This behavior is turned into a unique fingerprint used by personalized Trust Guardian Systems to block or allow network actions. In effect the user or organization secures themselves through their unique behavior. Furthermore, the network observations can be anonymously aggregated and used to build a global trust fingerprint. At step 1004, if the TGS determines that a communication is risky, then the TGS system takes over. At step 1006 various actions can be taken, including further analysis of the communication or forcing the attacker to work harder. If the TGS determines there is no risk, then at step 1016 the communication is allowed to proceed or continue. If there is risk, then at step 1008 the TGS can determine to block the communication; this would be used to block security threats before they even reach the device or network being protected. At step 1012, the TGS, using the guardians, has analyzed the behavior of the activity or communication to determine if the communication is risky.

If the communication is not blocked, then at step 1010 the TGS performs further analysis of the communication or activity. In accordance with some aspects and embodiments of the invention, the TGS can alter or change the communication protocols, such as change the communication speed, redirect the communication, provide false or inaccurate information, etc. As part of the analysis, information is collected based on a series of questions.

Communication between guardians to establish whether a specific action is trusted is mediated by a set of primitive questions (the OpenTrust protocol below) that maintain confidentiality while establishing a probability of trust. These questions would be asked of other guardians in order to establish the trustworthiness of a user or an activity, or provenance of a piece of information.

Guardians communicate across the Trust Network using a well-defined grammar which makes up part of the RESTful OpenTrust Protocol of four principal questions, which can be extended include:

Where the two communicating TGSs (representing people or organizations, say X and Y)
Q. Are you/am I allowed to do this?
Q. Am I who I say I am?
Q. Are you who you say you are?
Q. What does everyone else (third parties/other TGSs) think?

In accordance with some aspects of the invention, the answers are returned from each guardian interrogated as a probability.

OpenTrust protocol questions can ask semantically valid questions which do not give away specifics. For example, consider the question "Is Geoff using his home computer to perform an online banking transaction?". The question is meaningful, yet gives away no specific private information about Geoff's specific computer or bank. However, guardians can make sense of this query and answer the question with a probability, the accuracy of which depends on how much information about Geoff's life is contained in the private data of the person or organization that they represent.

By aggregating data distributed across a network such as the Internet from guardians using the OpenTrust protocol defined herein, a Trust Network can be built to help secure the network (such as the Internet) and provide a more accurate provenance "score" (or Trust Score) than any individual trust score generated by a single guardian in a TGS for data on that network without distributing the private data guarded by the TGS relating to the life of the person or organization they represent. In accordance with various aspects of the invention, the interconnection of the guardian in the TGS allows the calculation of the trust of a person, activity, or network entity/URI, without the need to analyze the underlying private data, upon which the calculation is based.

The integrity of individual guardians in TGSs is maintained by creating a unique value representing a particular guardian, such as a "hash," combined with a public key used by the guardian, which is stored in a globally distributed BlockChain (the Trust Chain) which allows other guardians to validate the identity of a guardian they are communicating with and encrypting messages between them with the appropriate public keys stored in the public globally distributed Trust Chain.

As will be apparent to those of skill in the art upon reading this disclosure, each of the aspects described and illustrated herein has discrete components and features, which may be readily separated from or combined with the features and aspects to form embodiments, without departing from the scope or spirit of the invention. Any recited method can be carried out in the order of events recited or in any other order which is logically possible. For example, in accordance with one embodiment of the invention, a TGS may include a guardian and a behavior unit. Additionally, in accordance with one embodiment of the invention, a TGS may include a guardian, a behavior unit and a gateway. Furthermore, in accordance with one embodiment of the invention, a TGS may include a guardian and a gateway. Thus, unless expressly limited, the components and features of the various aspects and embodiments of the invention may be combined in any way.

Unless defined otherwise, all technical and scientific terms used herein have the same meaning as commonly understood by one of ordinary skill in the art to which this invention belongs. Any methods and materials similar or equivalent to those described herein can also be used in the practice of the invention. Representative illustrative methods and materials are also described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

In accordance with the teaching of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Where a range of values is provided, it is understood that each intervening value, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

To the extent that the terms "including", "includes", "having", "has", "with", or variants thereof are used in either the detailed description and the claims, such terms are intended to be inclusive in a similar manner to the term "comprising". Therefore, the scope of the invention, therefore, is not intended to be limited to the various aspects and embodiments discussed and described herein. Rather, the scope and spirit of invention is embodied by the appended claims.

The invention claimed is:

1. A method comprising the steps of:
   receiving, at a device including a trust guardian system, a request from an unknown requestor;
   sending, from the device's trust guardian system, at least one query about the unknown requestor to at least one other trust guardian system associated with a trusted source;
   receiving, at the device's trust guardian system, response information from the trusted source about the unknown requestor;
   analyzing, at the device's trust guardian system, the response information to determine risk level associated with responding to the unknown requestor's request;
   generating a risk graph for the unknown requestor, wherein the risk graph includes a visual representation of risk;
   determining a response to be sent to the unknown requestor;
   determining, when the response is to be sent, a plurality of communication parameters used to provide the response; and
   modifying at least one communication parameter of the plurality of communication parameters to change response speed and allow further investigation about the unknown requestor.

2. The method of claim 1 further comprising the step of sending the response using response parameters that are the same as the request's communication parameters, when the risk of sending the response is low.

3. The method of claim 1, wherein modifying the at least one communication parameter is performed without alerting the unknown requestor, when the risk of sending the response is high.

4. The method of claim 1 further comprising redirecting the request without alerting the unknown requestor.

5. The method of claim 1 further comprising redirecting the request to a control node, without alerting the unknown requestor, to investigate and gather additional information about the unknown requestor.

6. The method of claim 1 further comprising sending a false response to the request when the risk is high.

* * * * *